United States Patent
Kim et al.

(10) Patent No.: US 10,813,159 B2
(45) Date of Patent: Oct. 20, 2020

(54) METHOD FOR PERFORMING ACCESS CONTROL IN NEXT-GENERATION MOBILE COMMUNICATION NETWORK, AND USER EQUIPMENT

(71) Applicant: LG Electronics Inc., Seoul (KR)

(72) Inventors: Jaehyun Kim, Seoul (KR); Sangmin Park, Seoul (KR); Jinsook Ryu, Seoul (KR); Myungjune Youn, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/315,579

(22) PCT Filed: Jul. 4, 2017

(86) PCT No.: PCT/KR2017/007052
§ 371 (c)(1),
(2) Date: Jan. 4, 2019

(87) PCT Pub. No.: WO2018/008927
PCT Pub. Date: Jan. 11, 2018

(65) Prior Publication Data
US 2019/0313473 A1    Oct. 10, 2019

Related U.S. Application Data

(60) Provisional application No. 62/358,170, filed on Jul. 5, 2016.

(51) Int. Cl.
*H04W 76/25* (2018.01)
*H04W 48/04* (2009.01)
(Continued)

(52) U.S. Cl.
CPC ............. *H04W 76/25* (2018.02); *H04W 8/08* (2013.01); *H04W 48/02* (2013.01); *H04W 48/04* (2013.01);
(Continued)

(58) Field of Classification Search
CPC ..... H04W 76/18; H04W 76/25; H04W 76/27; H04W 8/08; H04W 48/04; H04W 48/08; H04W 48/16; H04W 48/17; H04W 74/08
See application file for complete search history.

(56) References Cited

U.S. PATENT DOCUMENTS

2016/0219493 A1    7/2016    Kim et al.
2017/0367120 A1*  12/2017    Murray ................. H04L 5/0023
(Continued)

FOREIGN PATENT DOCUMENTS

| CN | 105612788 | 5/2016 |
| CN | 105659691 | 6/2016 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.1.0 (Mar. 2016), 553 pages.

(Continued)

*Primary Examiner* — Candal Elpenord
(74) *Attorney, Agent, or Firm* — Fish & Richardson P.C.

(57) ABSTRACT

Disclosed in the present specification is a method by which a user equipment (UE) performs access control. The method comprises the steps of: allowing a non-access-stratum (NAS) layer of the UE to transfer information on an important service and a NAS signaling request to a radio resource control (RRC) layer, when the important service is required even if access to a cell is currently interrupted or a back-off (Continued)

timer is operated; and allowing the RRC layer to skip or override an inspection for access control on the basis of the information on the important service, wherein, the information on the important service can be set in advance.

12 Claims, 10 Drawing Sheets

(51) Int. Cl.
*H04W 76/18* (2018.01)
*H04W 48/16* (2009.01)
*H04W 8/08* (2009.01)
*H04W 76/27* (2018.01)
*H04W 48/00* (2009.01)
*H04W 48/08* (2009.01)
*H04W 74/08* (2009.01)
*H04W 48/02* (2009.01)

(52) U.S. Cl.
CPC ........... *H04W 48/08* (2013.01); *H04W 48/16* (2013.01); *H04W 48/17* (2013.01); *H04W 74/08* (2013.01); *H04W 76/18* (2018.02); *H04W 76/27* (2018.02)

(56) References Cited

U.S. PATENT DOCUMENTS

| | | | | |
|---|---|---|---|---|
| 2017/0374613 | A1* | 12/2017 | Ianev | H04W 40/04 |
| 2018/0027479 | A1* | 1/2018 | Ahmad | H04W 48/06 |
| | | | | 370/235 |
| 2018/0359681 | A1* | 12/2018 | Futaki | H04W 48/10 |
| 2018/0376407 | A1* | 12/2018 | Myhre | H04W 76/27 |

FOREIGN PATENT DOCUMENTS

| | | |
|---|---|---|
| JP | 2014027694 | 2/2014 |
| JP | 2015505446 | 2/2015 |
| JP | 2015084558 | 4/2015 |
| KR | 10-2011-0133500 | 12/2011 |
| KR | 10-2016-0025269 | 5/2016 |
| KR | 1020160052569 | 5/2016 |
| WO | WO2015/116718 | 8/2015 |
| WO | WO2016/003140 | 1/2016 |
| WO | WO2016/035326 | 3/2016 |
| WO | 2016076606 | 5/2016 |

OTHER PUBLICATIONS

Intel Corporation, "Discussion on the specification impacts due to requirements to prioritize MMTEL voice, MMTEL video and SMS," 'R2-140493', 3GPP TSG RAN WG2 Meeting #85, Feb. 10-14, 2014, Prague, Czech Republic, 9 pages.

Aoyagi et al., "Access Class Control Technology in LTE/LTE-Advanced Systems", NTT DoCoMo Technical Journal 17(2): 65-76, Oct. 2015.

EP Office Action in European Application No. EP17824483, dated Dec. 3, 2019, 11 pages.

LG Electronics, "New Key Issue: Congestion and access control for Next Generation Network Architecture", S2-163522, SA WG2 Meeting #116, Jul. 11-15, 2016, Vienna, Austria, 3 pages.

Ericsson, "Details of bypassing ACB solution for SCM," R2-140638, 3GPP TSG-RAN WG2 #85, Prague, Czech Republic, Feb. 10-14, 2014, 6 page.

Huawei, HiSilicon, "Discussion on ACB skip mechanism for IMS services and SMS," C1-141077, 3GPP TSG CT WG1 Meeting #86bis, Dubrovnik, Croatia, Mar. 31-Apr. 4, 2014, 6 pages.

\* cited by examiner

METHOD FOR PERFORMING ACCESS CONTROL IN NEXT-GENERATION MOBILE COMMUNICATION NETWORK, AND USER EQUIPMENT

CROSS-REFERENCE TO RELATED APPLICATIONS

This application is a National Stage application under 35 U.S.C. § 371 of International Application No. PCT/KR2017/007052, filed on Jul. 4, 2017, which claims the benefit of U.S. Provisional Application No. 62/358,170, filed on Jul. 5, 2016. The disclosures of the prior applications are incorporated by reference in their entirety.

BACKGROUND OF THE INVENTION

Field of the Invention

The present invention relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 Shows the Configuration of an Evolved Mobile Communication Network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Congestion Control in 4G Mobile Communication>

When network congestion occurs in a 3GPP network, a node (MME and SGSN) of a core network performs NAS level congestion control to avoid or control signaling congestion and APN congestion.

The NAS level congestion control includes APN based congestion control and general NAS level mobility management control.

The APN based congestion control refers to EMM, GMM and (E)SM signaling congestion control related to a UE (that is, MTC device) and a particular APN (APN associated with congestion), which includes APN based Session Management congestion control and APN based Mobility Management congestion control.

The general NAS level mobility management control means that the node (MME and SGSN) of the core network rejects a Mobility Management signaling request made by a UE/MS in general network congestion or overload to avoid congestion and overload.

Generally, when the core network performs NAS level congestion control, the core network transmits a back-off timer value via an NAS Reject message to a UE in idle mode or connected mode, and the UE does not request an EMM/GMM/(E)SM signal from the network until the back-off timer expires. The NAS Reject message corresponds to one of ATTACH REJECT, Tracking Area Updating (TAU)/Routing Area Updating (RAU) Reject, Service Reject, EXTENDED SERVICE Reject, PDN Connectivity Reject, bearer resource allocation reject, bearer resource modification reject, and deactivate EPS bearer context request reject messages.

The back-off timer may include an MM back-off timer and an SM back-off timer.

The MM back-off timer operates by UE, and the SM back-off timer operates independently by APN and UE.

In short, the MM back-off timer is for controlling EMM/GMM signaling (for example, Attach and TAU/RAU requests). The SM back-off timer is for controlling (E)SM signaling (for example, PDN connectivity, Bearer Resource Allocation, Bearer Modification, PDP Context Activation and PDP Context Modification requests).

In detail, the MM back-off timer is a back-off timer relating to mobility used to control network congestion, which does not allow the UE to conduct an Attach request, TAU and RAU requests, and a service request procedure while the timer is operating. Exceptionally, the UE may be allowed to request an emergency bearer service and a Multimedia Priority Service (MPS) while the time is operating.

As described above, the UE may receive an MM back-off timer value from the network node (for example, MME, SGSN, or the like) of the core network or from a lower layer (Access Stratum). Alternatively, the UE may set a random MM back-off timer value in a range of 15 minutes to 30 minutes.

Meanwhile, the SM back-off timer is a back-off timer relating to SM used to control network congestion, which does not allow the UE to set up or modify an associated APN based session while the timer is operating. Exceptionally, the UE (device) may also be allowed to request an emergency bearer service and a Multimedia Priority Service (MPS) while the time is operating.

The UE may receive an SM back-off timer value from the network node (for example, MME, SGSN, or the like) of the core network, which is randomly set within up to 72 hours. Alternatively, the UE may set a random MM back-off timer value in a range of 15 minutes to 30 minutes.

The (e)NodeB may also perform congestion control. In congestion in a Radio Access Network (RAN) or key network, the UE may receive a Reject response from the (e)NodeB along with an extended wait timer when performing an RRC/RR(C) connection establishment procedure. In this case, the UE is not allowed to initiate the EMM/GMM procedure until the extended wait timer received from the (e)NodeB expires (thus, the UE is not allowed to initiate the RRC/RR(C) connection establishment procedure). The UE uses the extended wait timer an MM back-off timer.

FIGS. 2a and 2b Illustrate a Procedure of Rejecting an MM Operation or SM Operation of an MTC Device in Network Congestion or Overload.

Referring to FIG. 2a, when the MTC 100 performs a procedure for an Attach request, a TAU request, an RAU request, or a service request through an (e)NodeB 200 in network congestion or overload, a node, for example, MME/SGSN 510, in the network transmits a Reject message with respect to the Attach request, TAU request, RAU request, or service request in accordance with a network condition, such as an operator policy.

The MME/SGSN 510 include a back-off timer in the Reject message when transmitting the Reject message, so that the MTC device 100 may not reattempt connection until the back-off timer expires.

Alternatively, as illustrated in FIG. 8b, in network congestion or overload, the network node, for example, MME/

SGSN 510, may transmit the back-off timer to the MTC device 100 through the (e)NodeB 200 in accordance with a network condition, such as an operator policy. The back-off timer may include a message (for example, Deactivate EPS Bearer Context request and Deactivate PDP context request) transmitted by the MME/SGSN 510 to the MTC device 100 at transmission.

Meanwhile, when the Reject message is a TAU Reject message, data listed in Table 3 may be included.

TABLE 3

| Data | Description |
| --- | --- |
| Protocol discriminator | Discriminator to distinguish protocol |
| Security header type | Type of header used for security |
| TAU Reject message ID | Identifier of message |
| Reason for EMM | Indicates reason for rejection |
| T3346 value | Back-off timer (MM back-off timer) |

Meanwhile, when the message is a Deactivate EPS Bearer Context request message, data listed in Table 4 may be included.

TABLE 4

| Data | Description |
| --- | --- |
| Protocol discriminator | Discriminator to distinguish protocol |
| EPS bearer ID | Identifier of EPS bearer |
| Procedure transaction ID | Identifier of procedure transaction |
| Deactivate EPS bearer context request message ID | Identifier of message |
| Reason for ESM | Indicates reason for rejection |
| Protocol configuration options | Protocol related information |
| T3396 value | Back-off timer (SM back-off timer) |

Meanwhile, the eNodeB 200 may also perform congestion control. For example, the eNodeB 200 may operate as in FIG. 8c with respect to an RRC connection request, thereby performing congestion control.

FIG. 2c Illustrates Rejection of RRC Connection.

Referring to FIG. 2c, the MTC device 100 in an idle state transmits an RRC connection request message to the eNodeB 200 to conduct an RRC connection for data transmission.

Here, when the eNodeB 200 is overloaded, the eNodeB 200 transmits an RRC Connection Reject message to the MTC device 100. The RRC Connection Reject message may include an extended wait timer. The extended wait timer is a wait time in seconds for a Delay Tolerant access request. The extended wait timer may be set to up to 1800 seconds (that is, 30 minutes).

FIG. 3 is a Flowchart Illustrating a Barring Operation by Access Control in a Network Congestion State.

As shown in FIG. 3, in an overloaded or congested state of a network or an eNodeB 200, the eNodeB 200 may broadcast access class barring (ACB) related information through system information. The system information may be a system information block (SIB) type 2.

The SIB type 2 may include ACB related information shown in Table 4.

TABLE 4

| Field | Description |
| --- | --- |
| ac-BarringFactor | When a random value generated by the UE is smaller than a value by an ac-BarringFactor, access is allowed. Otherwise, access is barred. |

TABLE 4-continued

| Field | Description |
| --- | --- |
| ac-BarringForCSFB | ACB for circuit switch (CS) fallback. CS fallback is to convert a VoLTE call to a previous 3G call. |
| ac-BarringForEmergency | ACB for emergency service |
| ac-BarringForMO-Data | ACB for mobile orienting data |
| ac-BarringForMO-Signalling | ACB for a mobile orienting control signal |
| ac-BarringForSpecialAC | ACB for a special access class, i.e., 11-15 |
| ac-BarringTime | Indicate a time in which access is barred. |
| ssac-BarringForMMTEL-Video | ACB on a service basis for transmission of MMTEL video |
| ssac-BarringForMMTEL-Voice | ACB on a service basis for transmission of MMTEL voice |

A UE1 100a determines an IMS service, for example, transmission of a call by VoLTE and generates a service request message. Similarly, a UE2 100b determines transmission of general data and generates a service request message.

Thereafter, the UE1 100a generates an RRC connection request message. Similarly, the UE2 100b generates an RRC connection request message.

The UE1 100a performs an access barring check (i.e., whether ACB is applied). Similarly, the UE2 100b performs an access barring check (i.e., whether ACB is applied).

If the UE1 100a and the UE2 100b are not application targets of the ACB, the UE1 100a and the UE2 100b each may transmit a service request (or an extension service request) message and an RRC connection request message. However, if the UE1 100a and the UE2 100b are application targets of the ACB, both the UE1 100a and the UE2 100b may not transmit an RRC connection request message.

The access barring check will be described in detail as follows. At least one of ten access classes (e.g., AC0, AC1, . . . , AC9) is generally randomly assigned to the UE. Exceptionally, AC10 is assigned for emergency access. A value of an access class randomly assigned in this way may be stored in each universal subscriber identity module (USIM) of the UE1 100a and the UE2 100b. Accordingly, the UE1 100a and the UE2 100b determine whether access barring is applied using a barring factor field included in the received ACB related information based on the stored access class. Such an access barring check is performed in each access stratum (AS) layer, i.e., an RRC layer of the UE1 100a and the UE2 100b.

The access barring check will be described in more detail as follows.

When an ac-BarringPerPLMN-List is included in an SIB type 2 received by each of the UE1 100a and the UE2 100b and when an AC-BarringPerPLMN entry matched to a plmn-identityIndex corresponding to a PLMN selected in an upper layer is included in the ac-BarringPerPLMN-List, an AC-BarringPerPLMN entry matched to a PLMN-identityIndex corresponding to the PLMN selected by the upper layer is selected.

Thereafter, when the UE1 100a and the UE2 100b perform an RRC connection request, an access barring check is performed using T303 as Tbarring and using ac-BarringForMO-Data as a barring parameter.

When access barring is determined, each AS layer (i.e., RRC layer) of the UE1 100a and the UE2 100b notifies the upper layer of a failure of RRC connection establishment.

Thereafter, when access is barred in this manner, each AS layer (i.e., RRC layer) determines whether a T302 timer or a Tbarring timer is driving. If a T302 timer or a Tbarring timer is not driving, each AS layer (i.e., the RRC layer) drives the T302 timer or the Tbarring timer.

While the T302 timer or the Tbarring timer is driving, the AS layer (i.e., RRC layer) regards that all access to a corresponding cell is barred.

As described above, in a network overloaded and congested situation, an eNB/RNC provides access class barring (ACB) related information to the UE. Accordingly, the UE checks access barring using a barring factor included in the received ACB information based on an access class thereof stored in the USIM. An access attempt is finally prevented through the access barring check. That is, when access to a corresponding cell is barred through the access barring check, the UE does not attempt access, and when access to a corresponding cell is not barred, the UE attempts access. Such an access barring check is performed in an access stratum (AS) layer of the UE. Here, the access attempt means transmission of an RRC connection request message from the AS layer (i.e., RRC layer) of the UE to the eNB/RNC.

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 4a Illustrates an Expected Structure of the Next Generation Mobile Communication from the Viewpoint of a Node.

As may be seen with reference to FIG. 4a, a UE may access the core network through a next generation Radio Access Network (RAN). The next generation core network may include a control plane (CP) function node and a user plane (UP) function node. The CP function node, which is a node for managing UP function nodes and RAN, transmits and receives a control signal. The CP function node performs all or part of the functions of a Mobility Management Entity (MME) in the fourth generation mobile communication; and all or part of the control plane functions of a Serving Gateway (S-GW) and a PDN Gateway (P-GW). The UP function node is a kind of gateway through which user data are transmitted and received. The UP function node may perform all or part of the user plane functions of the S-GW and the P-GW in the fourth generation mobile communication.

The Policy Control Function (PCF) in the figure is a node for controlling the policies of a service provider. And the subscriber information server shown stores subscription information of a user.

FIG. 4b Illustrates an Expected Structure of the Next Generation Mobile Communication from the Viewpoint of a Session.

As shown in the figure, the core network is divided into a control plane (CP) and a user plane (UP). The control plane (CP) may include a policy control function (PCF), a subscriber information server, and a CP node which performs session management (SM). And the user plane (UP) may include a UP function node. The nodes within the control plane (CP) are implemented through cloud virtualization. And so are the nodes within the user plane (UP).

The UE may request creation of a session directed to a data network (DN) through an access network (AN). The session may be created and managed by the CP node for session management (SM). At this time, the session management may be performed according to the information stored in the subscriber information server and the policies (for example, a QoS management policy) of a service provider stored within the policy control function (PCF) entity. In other words, if receiving a request for creation/modification/release of a session from the UE, the CP node for session management (SM) obtains the information through interaction with the subscriber information server and the policy control function (PCF) and creates/modifies/releases the session. Also, the CP node for session management (SM) selects a UP function node for the session and allocates resources of the core network. Also, the CP node for session management (SM) may allocate an IP address directly to the UE or request the UP function node to allocate an IP address to the UE.

SUMMARY OF THE INVENTION

As described above, 5G mobile communication is designed to provide data rates of maximum 20 Gbps, and a network overload problem has not been considered until now.

However, in a few years after commercialization, a congestion problem due to a network overload should be considered. Therefore, congestion and access control schemes are required.

Therefore, disclosures of the present specification provide a congestion control method for next generation mobile communication.

In an aspect, there is provided a method in which a user equipment (UE) performs access control. The method includes transferring, by a non-access-stratum (NAS) layer of the UE, when an important service is required, information about the important service and a NAS signaling request to a radio resource control (RRC) layer, even if access to a cell is currently barred or even if a back-off timer is driven; and skipping or overriding, by the RRC layer, a check for access control based on the information about the important service. The information about the important service is preset in advance.

The back-off timer may be driven on a specific criterion basis.

The method may further include receiving in advance setting information about the specific criterion The specific criterion may include at least one of a UE type, a service type, a communication type, network slicing, and a group.

The access to the cell may be barred on a specific criterion basis.

The method may further include overriding or stopping the driving back-off timer.

The information about the important service may be included in a call type, an RRC establishment cause, or a category to be transferred to the RRC layer.

In another aspect, there is provided a user equipment for performing access control. The user equipment includes a transceiver; and a processor configured to control the transceiver and to drive a radio resource control (RRC) layer and a non-access-stratum (NAS) layer. Even if access to a cell is currently barred or even if a back-off timer is driven, when an important service is required, a non-access-stratum (NAS) layer of the processor transfers information about the important service and a NAS signaling request to a radio resource control (RRC) layer. The RRC layer of the processor skips or overrides a check for access control based on the information about the important service. The information about the important service is preset in advance.

According to the disclosure of the present invention, the problem of the conventional technology described above may be solved.

Figure 1:
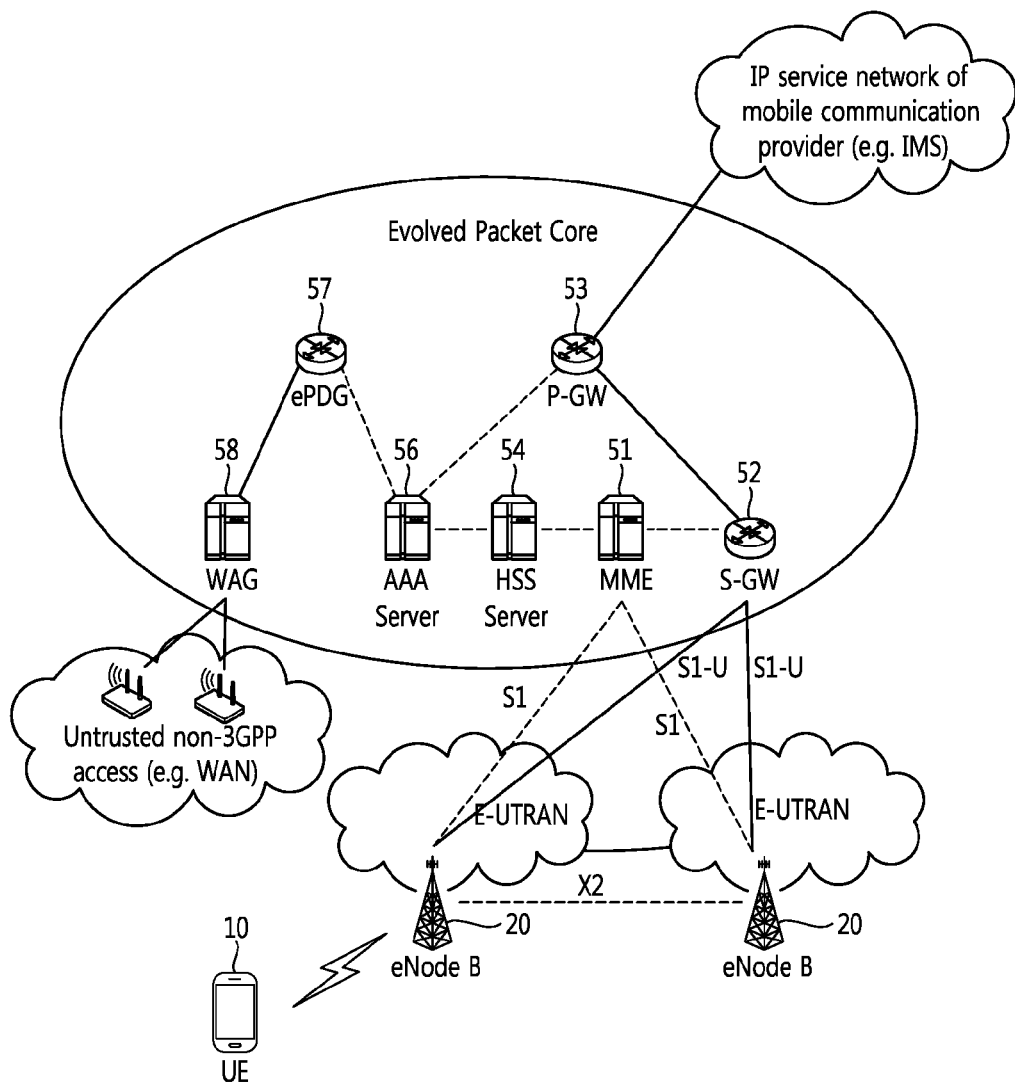
FIG. 1 is a diagram illustrating a configuration of an evolved mobile communication network.
Figure 2A:
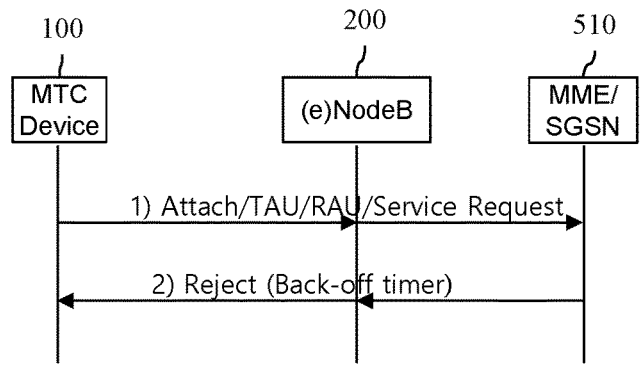
FIGS. 2a and 2b illustrate a procedure for rejecting an MM operation or an SM operation of a UE when network congestion or overload occurs.
Figure 2B:
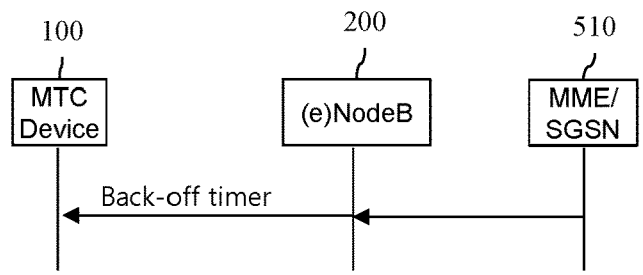
Figure 2C:
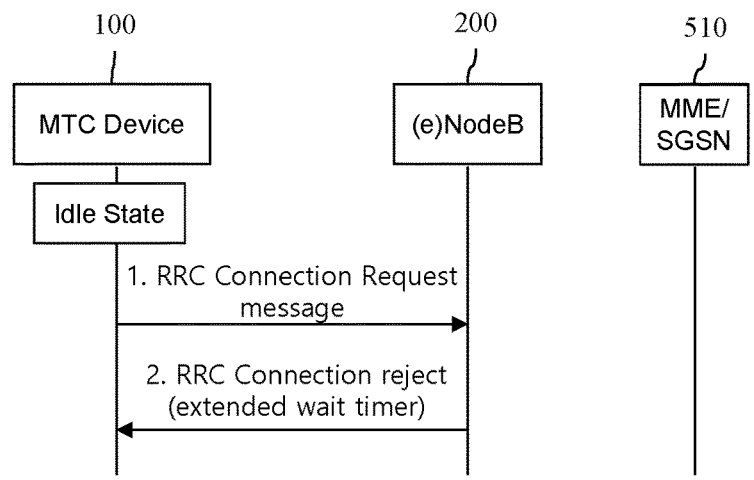
FIG. 2c illustrates an example in which an RRC connection is rejected.

DESCRIPTION OF EXEMPLARY
EMBODIMENTS

The present invention is described in light of UNITS (Universal Mobile Telecommunication System) and EPC (Evolved Packet Core), but not limited to such communication systems, and may be rather applicable to all communication systems and methods to which the technical spirit of the present invention may apply. The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

Figure 5:
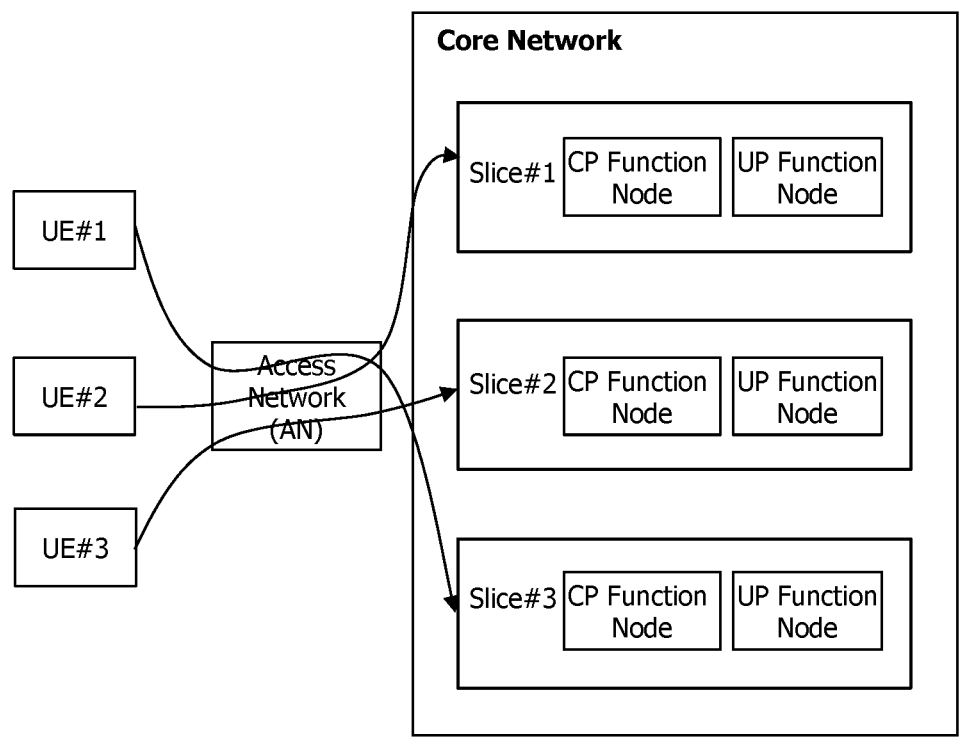
FIG. 5 is a diagram illustrating an example of architecture for implementing the concept of network slicing.

FIG. 5 Illustrates an Example of Architecture for Implementing Network Slicing.

As may be noticed with reference to FIG. 5, the core network (CN) may be divided into several slice instances. Each slice instance may include one or more of a CP function node and a UP function node.

Each UE may use a network slice instance relevant to its service through the access network (AN).

Figure 3:
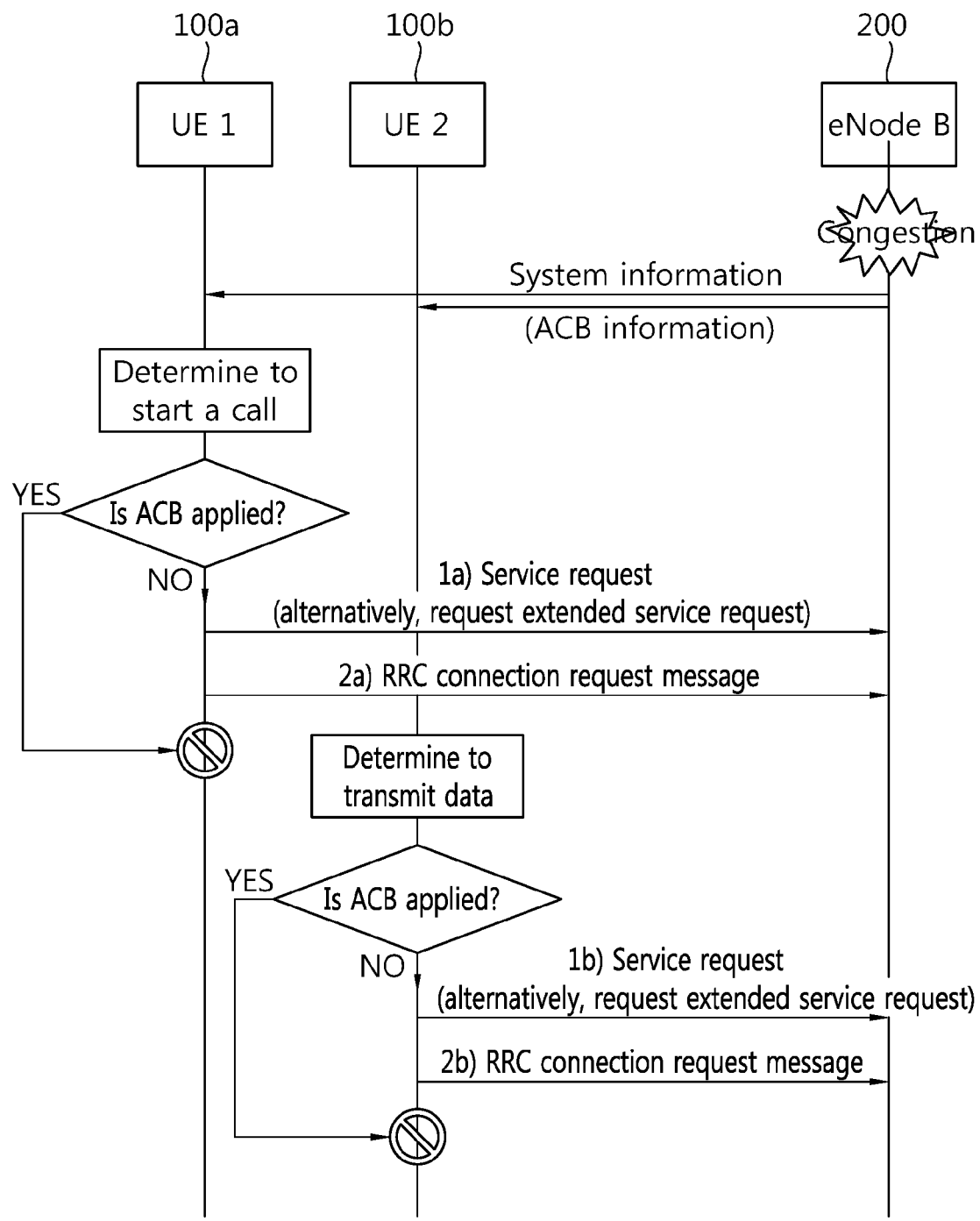
FIG. 3 is a flowchart illustrating a barring operation by access control in a network congestion state.
Figure 4A:
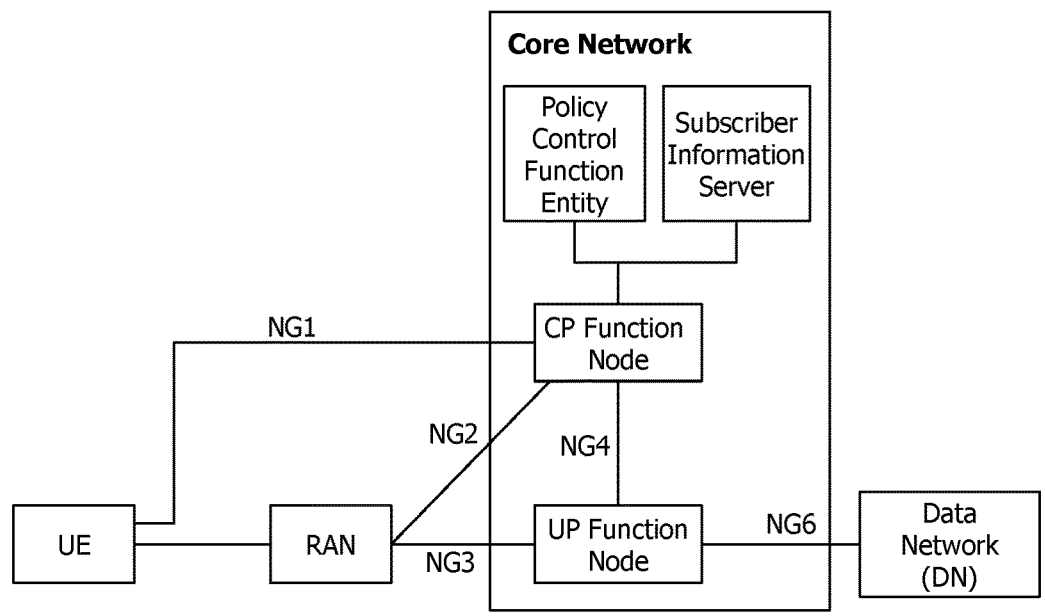
FIG. 4a illustrates an expected structure of next generation mobile communication from a node viewpoint.
Figure 4B:
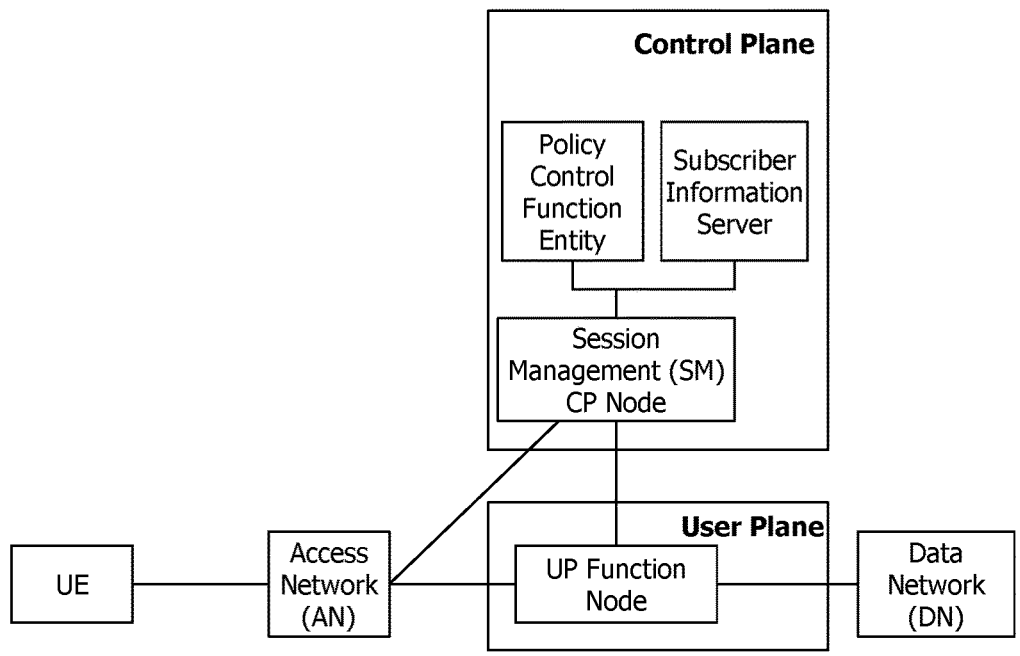
FIG. 4b illustrates an expected structure of next generation mobile communication from a session management viewpoint.

Different from FIG. 5, each slice instance may share one or more of the CP function node and the UP function node with other slide instance. This feature will be described with reference to FIG. 3 below.

Figure 6:
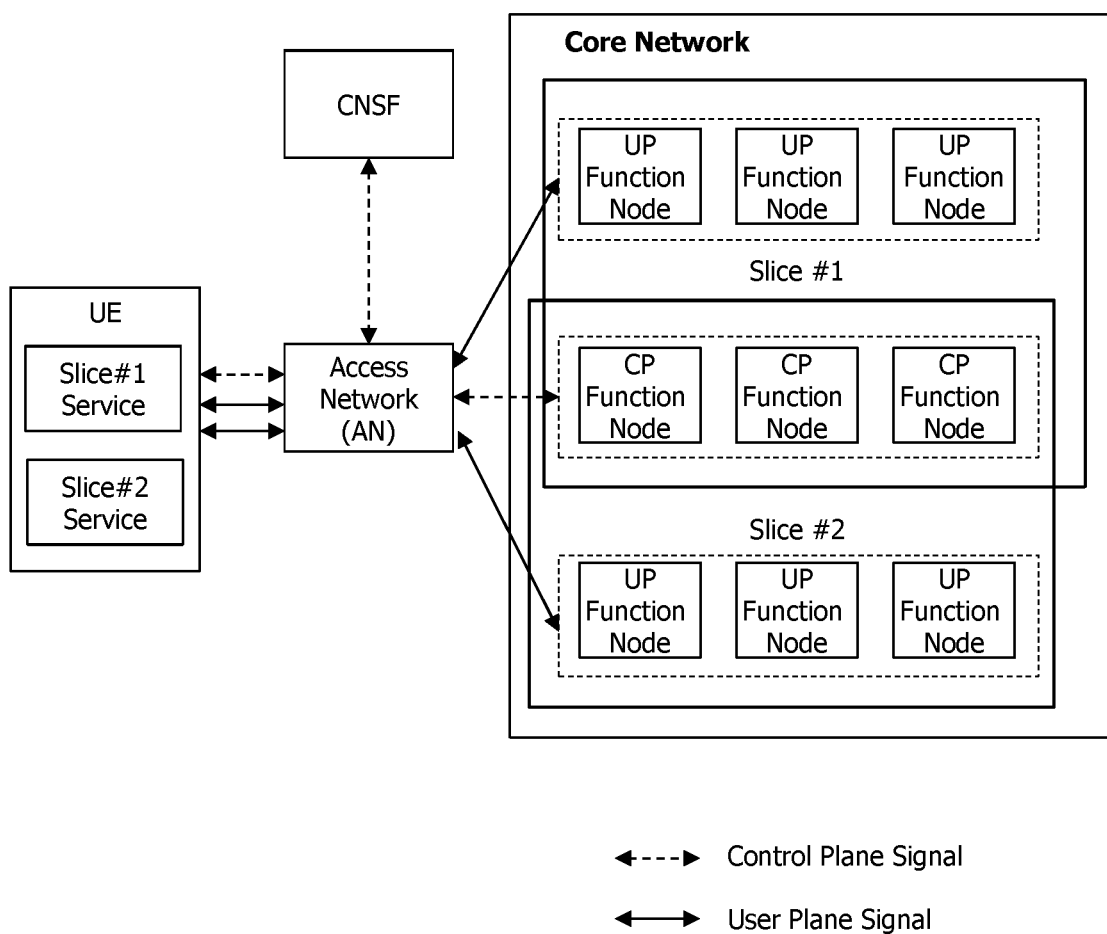
FIG. 6 is a diagram illustrating another example of architecture for implementing the concept of network slicing.

FIG. 6 Illustrates Another Example of the Architecture for Implementing Network Slicing.

Referring to FIG. 6, a plurality of UP function nodes are clustered, and a plurality of CP function nodes are also clustered.

And referring to FIG. 6, slice instance #1 within the core network (which is also called instance #1) includes a first cluster of UP function nodes. And the slice instance #1 shares the cluster of CP function nodes with slice #2 (which is also called instance #2). The slice instance #2 includes a second cluster of UP function nodes.

The Core Network Selection Function (CNSF) shown in the figure selects a slice (or instance) capable of accommodating a service of the UE.

The UE in the figure may use the service #1 through the slice instance #1 selected by the CNSF and also use the service #2 through the slice instance #2 selected by the CNSF.

In the foregoing description, the concept of network slicing has been described.

As described above, 5G mobile communication is designed to provide data rates of maximum 20 Gbps, and a network overload problem has not been considered until now.

However, in a few years after commercialization, a congestion problem due to a network overload should be considered. Therefore, congestion and access control schemes are required.

For example, in a specific situation (e.g., disaster event, network congestion or overload), in order to reduce congestion or overload of core network nodes, a non-access-stratum (NAS) signal request from the UE should be prevented. An evolved packet system (EPS) should support functions such as core network overload control and NAS level congestion control. The core network overload control means that signals advancing to a core network should be able to be limited/barred. The NAS level congestion control includes APN based session management congestion control and NAS level mobility management congestion control.

Further, in important situations, in order to prevent an overload of an access channel, access attempts of the UEs should be able to be controlled.

By introducing the concept of network slicing, the following requirements should be applied.

A next generation mobile communication network (hereinafter, referred to as NextGen or NGN) should be able to simultaneously operate network slices in a manner that prevents a service of one slice performed by an operator from having a negative effect on a service provided by the other slice.

According to the above requirements, the next generation mobile communication network should support a core network overload and congestion control of a NAS level on a network slice basis.

Further, it is necessary that the next generation mobile communication network supports more enhanced access control as follows.

A 3GPP system should be able to perform differentiated access control according to a subscriber PLMN, an access class, a device type (UE or IoT device), a service type (e.g., voice, SMS, specific data application), and a communication type (e.g., emergency call, signal and/or service transmission).

An enhanced service access control mechanism should be able to provide access to a limited service set determined by an operator's policy.

From the above requirements, the next generation mobile communication system should be able to support congestion and access control based on specific information (e.g., device type, service type, communication type, network slice, and specific group).

An operation of the next generation mobile communication network is summarized based on the above contents as follows.

1. The next generation mobile communication network should support core network overload control.
2. The next generation mobile communication network should support both mobility management congestion control and session management congestion control.
3. The next generation mobile communication network should support granular congestion control.
4. The next generation mobile communication network should support improved access control.
5. The next generation mobile communication network should support congestion and access control according to some criteria.

The above contents are summarized as follows.

Congestion and access control should be able to prevent a core network signal overload and NAS/RRC level congestion. It is expected that congestion and access control requirements of the next generation mobile communication network will be essentially similar to LTE/EPC according to next generation mobile communication network architecture, but methods may be different in which congestion and access control is performed according to network sophistication, specific criterion, and/or interaction.

The next generation mobile communication network should support core network overload control. The next generation mobile communication network should be able to detect a core network signal overload and limit/bar a core network signal. Further, both the UE and the next generation mobile communication network should support a function of providing mobility management congestion control and session management congestion control. The next generation mobile communication network may detect NAS signaling congestion according to a specific criterion (e.g., per APN, per slice, or per group) and/or a specific criterion (e.g., device type, service type, communication type, and specific group). Further, the next generation mobile communication network should support enhanced access control based on specific information (e.g., device type, service type, communication type, specific group, and specific slice).

As a solution to this key issue, the following contents should be studied.

i) Core Network Overload Control:
    A method of controlling core network signaling between core network nodes.
    A criterion in which a core network signal is controlled ii) Mobility Management Congestion Control Including the Following Contents
    A method of controlling a NAS signal connection between a UE and a CN for mobility management.
    A method of controlling a granular NAS signal connection.

iii) Session Management Congestion Control:
    A method of controlling a NAS signal connection between a UE and a CN for specific granular session management.
    Study on whether various basic PDU signaling connections are controlled to enable various PDU session scenarios.

iv) Improved Access Control:
    A method of controlling an RRC signal connection between an AN and a UE.
    A study on which RRC signal connection should be controlled.

v) Identification of a Correlation Between Congestion Control and Access Control Functions.
    A study on whether interworking between congestion control and access control is necessary to prioritize services according to an operator policy.

<Disclosure of the Present Specification>

Hereinafter, methods according to disclosure of the present specification will be described.

I. First Method

According to a first method, mobility management congestion control may be performed on a network slice (or network slice instance) basis and on a UE basis.

For this reason, the UE may recognize a network slice (or network slice instance). That is, the UE may recognize an identifier (e.g., ID) of a network slice (or network slice instance). These IDs may be preset (e.g., preset in the form of a management object (MO) according to an OMA-DM scheme or preset in the USIM) to the UE. Alternatively, a network may provide the IDs to the UE through a master information block (MIB), a system information block (SIB), or a NAS signaling (signaling such as attach request, tracking area update (TAU), location update request procedure, and service request) procedure.

Accordingly, when the UE performs mobility management (hereinafter, referred to as MM) related procedures (e.g., attach request, TAU, and service request), the UE may transmit a request message including an ID of a corresponding network slice (or network slice instance) to the network. When the network is in a congested and overloaded state, the network may reject a request from the UE. That is, the network may transmit a reject message to the UE. The reject message may include a back-off timer for mobility management congestion control together with a reject cause meaning congestion, overload, insufficient resources, and the like. The back-off timer may operate on an ID basis of a corresponding network slice (or network slice instance). That is, the back-off timer is bounded with an ID of a corresponding network slice (or network slice instance) and operates.

When the UE performs the mobility related procedure (e.g., attach request, TAU, location update request procedure, and service request), the UE may transmit a request message that does not include ID information of the corresponding network slice (or network slice instance) to the network. Therefore, when the network is in a congested and overloaded state, the network may transmit a reject message to the request from the UE. The reject message may include a back-off timer for mobility management congestion control related to an ID of the corresponding network slice (or network slice instance) together with a rejection cause meaning congestion, overload, insufficient resources, and the like. That is, even though the UE does not provide ID information of the corresponding network slice (or network slice instance), the network may recognize a network slice (or network slice instance) for the UE and provide the reject message together with the back-off timer. The back-off timer may operate on an ID basis of the corresponding network slice (or network slice instance). That is, the back-off timer may be bounded with an ID of the corresponding network slice (or network slice instance) and operate.

For example, when a back-off timer #1 corresponding to an ID #1 of the network slice (or the network slice instance) operates, the UE may not perform a NAS signaling request (e.g., attach request, TAU, location update request, and service request) for mobility management. However, the UE may perform a NAS signaling request (e.g., attach request, TAU, location update request, and service request) for mobility management corresponding to an ID #2 of the network slice (or network slice instance).

A more specific operation will be described as follows.

A NAS layer of the UE transmits a mobility management related request (e.g., attach request, TAU, location update request, and service request) to the network (e.g., AMF). In this case, the UE may include ID #1 information of the corresponding network slice (or network slice instance) in a request message and transmit the request message. When the network is in a congested and overloaded state, the network may transmit a reject message to the request from the UE. The reject message may include an ID #1 of the network slice (or network slice instance) together with a cause value meaning an overload, insufficient resources, and the like. In this case, the back-off timer #1 is applied/operates only to ID #1 of the corresponding network slice (or network slice instance). That is, the back-off timer #1 is bound with the ID #1 of the corresponding network slice (or network slice instance) and operates. When the back-off timer #1 related to the ID #1 of the network slice (or network slice instance) operates, the NAS layer of the UE may not perform a mobility management related request (e.g., attach request, TAU, location update request, and service request) or a network connection request related to the ID #1 of the network slice (or network slice instance). However, even when the back-off timer #1 operates, the UE may perform a mobility related procedure (e.g., attach request, TAU, location update request, and service request) related to the ID #2 of the network slice (or network slice instance). That is, the UE may transmit a request message including ID #2 information of the network slice (or network slice instance) to the network.

As described above, when the UE performs mobility related procedures (e.g., attach request, TAU, location update request, and service request), the UE may transmit a request message that does not include ID information of the network slice (or network slice instance) to the network. When the network is in a congested and overloaded state, the network may transmit a reject message to the request from the UE. The reject message may include an ID #3 of the corresponding network slice (or network slice instance) together with a reject cause value meaning congestion, overload, insufficient resources, and the like. That is, even though the request message transmitted by the UE does not include an ID #3 of the network slice (or network slice instance), the network may recognize a network slice (or network slice instance) for the UE and provide an ID #3 of the network slice (or network slice instance) together with the back-off timer #3 in the reject message. The back-off timer #3 may operate for an ID #3 of the network slice (or network slice instance). That is, the back-off timer is bound with an ID #3 of the corresponding network slice (or network slice instance) and operates.

The corresponding network means a common core network node (CP plane function node including a control node or gateway).

Back-off timers operating on an ID basis of the network slice (or network slice instance) may have different values (i.e., different timers may be used). Values of the back-off timer may be a random value provided by the network. Alternatively, when the network does not provide values of the back-off timer, the UE may arbitrarily determine and use a random value.

II. Second Method

According to a second method, mobility management congestion control may be performed on a specific criterion (e.g., UE type, service type, communication type, and specific group) and on a UE basis.

For this reason, the UE may recognize a specific criterion (e.g., UE type, service type, communication type, and specific group). Such information may be preset (e.g., preset in the form of a management object (MO) according to an OMA-DM scheme or preset in the USIM) to the UE. Alternatively, the network may provide the information to the UE through a master information block (MIB), a system information block (SIB), or a NAS signaling (signaling such as attach request, tracking area update (TAU), location update request procedure, or service request) procedure.

Accordingly, when the UE performs mobility management related procedures (e.g., attach request, TAU, location update request, and service request), the UE may transmit a request message including information such as a corresponding UE type, service type, communication type, and specific group to the network. When the network is in a congested and overloaded state, the network may transmit a reject message to the request from the UE. The rejection message may include a back-off timer for mobility management congestion control together with a rejection cause meaning congestion, overload, insufficient resources, and the like and may be provided to the UE. In this case, the back-off timer may operate according to information such as the corresponding UE type, service type, communication type, and specific group. That is, the back-off timer is bound with information such as the corresponding UE type, service type, communication type, and specific group and operates.

For example, when a back-off timer #1 corresponding to a specific criterion #1 (e.g., UE type #1, service type #1, communication type #1, or specific group #1) operates, the UE may not perform a NAS signaling request (e.g., attach request, TAU, location update request, and service request) for mobility management. However, the UE may perform a NAS signaling request (e.g., attach request, TAU, location update request, and service request) for mobility management corresponding to a specific criterion #2 (e.g., UE type #2, service type #2, communication type #2, or specific group #2).

A more specific operation will be described as follows.

First, the NAS layer of the UE transmits a mobility management related request (e.g., attach request, TAU, location update request, and service request) to the network (e.g., AMF). In this case, the UE may include information of a specific criterion #1 (e.g., corresponding UE type #1, service type #1, communication type #1, and specific group #1) in the request message. When the network is in a congested and overloaded state, the network may transmit a reject message to the request from the UE. The rejection message may include a back-off timer #1 for the specific criterion #1 (e.g., UE type #1, service type #1, communication type #1, or specific group #1) together with a rejection cause value meaning congestion, overload, insufficient resources and the like and may be provided to the UE. In this case, the back-off timer #1 is applied/operates only to the specific criterion #1 (e.g., the UE type #1, the service type #1, the communication type #1, or the specific group #1). That is, the back-off timer #1 is bound with the specific criterion #1 and operates. Therefore, when the back-off timer #1 for the specific criterion #1 operates, the NAS layer of the UE may not perform a network connection request or a mobility management related request (e.g., attach request, TAU, location update request, and service request) related to the specific criterion #1. However, even if the back-off timer #1 operates, the UE may perform a mobility related procedure (e.g., attach request, TAU, location update request, and service request) related to a specific criterion #2 (e.g., UE type #2, service type #, communication type #2, or specific group #2). In this case, the UE may include information about the specific criterion #2 (e.g., UE type #2, service type #2, communication type #2, or specific group #2) in a corresponding request message.

The corresponding network means a common core network node (CP plane function node including a control node or gateway).

The back-off timers operating according to information such as the corresponding UE type, service type, communication type, and specific group may have different values (i.e., different timers may be used). Values of the back-off timer may be a random value provided by the network. Alternatively, when the network does not provide values of the back-off timer, the UE may arbitrarily determine and use a random value.

III. Third Method

According to a third method, session management congestion control may be performed on an access point name (APN) basis or on a data network name (DNN) basis and on a UE basis.

For this reason, the UE may recognize the APN or the DNN. The APN or the DNN may be preset (e.g., preset in the form of a management object (MO) according to an OMA-DM scheme or preset in the USIM) to the UE. Alternatively, the network may provide the APN or the DNN to the UE through a master information block (MIB), a system information block (SIB), or a NAS signaling (signaling such as attach request, tracking area update (TAU), location update request procedure, and service request) procedure.

When the UE performs a session management related procedure (e.g., attach request, PDU session setup request, and PDU session modify request), the UE may transmit a request message including information such as the corresponding APN (or DNN) to the network. When the network is in a congested and overloaded state, the network may transmit a reject message to the request from the UE. The reject message may include a back-off timer for session management congestion control together with a rejection cause meaning congestion, overload, insufficient resources, and the like and may be provided to the UE. In this case, the back-off timer may operate according to information such as a corresponding APN or DNN. That is, the back-off timer may be bound with information of a corresponding APN or DNN and operate.

For example, when the back-off timer #1 corresponding to the APN (or DNN) #1 operates, the UE may not perform a NAS signaling request procedure (e.g., attach request, PDU session setup request, and PDU session modify request) for session management. However, the UE may perform a NAS signaling request procedure for session management corresponding to an APN (or DNN) #2.

Here, it should be noted that the back-off timer for the session management congestion control and the foregoing back-off timer for the mobility management congestion control are different timers.

A more specific operation will be described as follows.

When the NAS layer of the UE performs a session management related procedure (e.g., attach request, PDU session setup request, and PDU session modify request), the NAS layer transmits a request message including information of the corresponding APN (or DNN) #1 to the network. When the network is in a congested and overloaded state, the network may transmit a reject message to the request from the UE. The reject message may include a back-off timer #1 for session management congestion control together with a reject cause meaning congestion, overload, insufficient resources, and the like. In this case, the back-off timer may operate on an APN (or DNN) basis. That is, the back-off timer #1 may be bound with the corresponding APN (or DNN) #1 and operate.

Therefore, the NAS layer of the UE may not perform a network connection request or session management related request procedure related to the APN (or DNN) #1. However, even if the back-off timer #1 operates, the UE may transmit a request message for a session management related request procedure for the APN (or DNN) #2 to the network.

The corresponding network means a common core network node (CP plane function node including a control node or gateway).

The back-off timers operating on the APN or DDN basis may have different values (i.e., different timers may be used). Values of the back-off timer may be a random value provided by the network. Alternatively, when the network does not provide values of the back-off timer, the UE may arbitrarily determine and use a random value.

IV. Fourth Method

According to a fourth method, session management congestion control may be performed on an APN (or DNN) basis, on additional information/parameter basis, and on a UE basis.

For this reason, the UE may recognize an APN (or DNN) and additional information/parameter. The additional information/parameter means an IP address, a port number, an application ID, an ID of a network slice (or a network slice instance), a service type, and/or a category.

Such information may be preset (e.g., preset in the form of a management object (MO) according to an OMA-DM scheme or preset in the USIM) to the UE. Alternatively, the network may provide the information to the UE through a master information block (MIB), a system information block (SIB), or a NAS signaling (signaling such as attach request, tracking area update (TAU), location update request procedure, and service request) procedure.

When the UE performs a session management related procedure (e.g., attach request, PDU session setup request, and PDU session modify request), the UE may transmit a request message including the corresponding APN (or DNN) and the additional information/parameter to the network. When the network is in a congested and overloaded state, the network may transmit a reject message to the request from the UE. The reject message may include a back-off timer for session management congestion control together with a rejection cause meaning congestion, overload, insufficient resources, and the like. In this case, the back-off timer may operate on the corresponding APN (or DNN) basis and on the additional information/parameter basis. That is, the back-off timer may be bound with the corresponding APN (or DNN) and the additional information/parameter and operate.

Here, it should be noted that the back-off timer for session management congestion control and the foregoing back-off timer for the mobility management congestion control are different timers.

A more specific operation will be described as follows.

When the UE operates a back-off timer #1 corresponding to an APN (or DNN) #1 and additional information/parameter #1, the UE may not perform a NAS signaling request procedure (e.g., attach request, PDU session setup request, and PDU session modify request) for session management. However, the UE may perform a NAS signaling request procedure for session management corresponding to an APN #2 (or DNN #2) and additional information/parameter #2. Further, the UE may perform a NAS signaling request procedure for session management corresponding to the APN (or DNN) #1 and the additional information/parameter #2.

Alternatively, the UE may perform a NAS signaling request procedure for session management corresponding to the APN (or DNN) #2 and the additional information/parameter #1.

The corresponding network means a common core network node (CP plane function node including a control node or gateway).

The back-off timers operating on the APN (or DNN) and additional information/parameter basis may have different values (i.e., different timers may be used). Values of the back-off timer may be a random value provided by the network. Alternatively, when the network does not provide values of the back-off timer, the UE may arbitrarily determine and use a random value.

V. Fifth Method

According to a fifth method, congestion control for mobility management of the NAS layer and access control of the RRC layer may be related to each other and be performed.

The UE and the next generation mobile communication network (NGN) may perform congestion control and access control for mobility management on a specific criterion (e.g., UE type, service type, communication type, specific group, or ID of network slice (or network slice instance)) basis and on a UE basis. For this reason, the UE may recognize the specific criterion (e.g., UE type, service type, communication type, specific group, or ID of network slice (or network slice instance)).

Such information may be preset (e.g., preset in the form of a management object (MO) according to an OMA-DM scheme or preset in the USIM) to the UE. Alternatively, the network may provide the information to the UE through a master information block (MIB), a system information block (SIB), or a NAS signaling (signaling such as attach request, tracking area update (TAU), location update request procedure, and service request) procedure.

Accordingly, when the UE performs an MM related procedure (e.g., attach request, TAU, location update request, and service request), the UE may transmit a request message including the specific criterion (e.g., corresponding UE type, service type, communication type, specific group, or ID of network slice (or network slice instance)) information to the network. When the network is in a congested and overloaded state, the network may transmit a reject message to the request from the UE. The reject message may include a back-off timer for MM congestion control together with a rejection cause meaning congestion, overload, insufficient resources, and the like and may be provided to the UE. In this case, the back-off timer may operate according to the specific criterion (e.g., corresponding UE type, service type, communication type, specific group, or ID of network slice (or network slice instance)). That is, the back-off timer may be bound with the specific criterion and operate.

Figure 7:
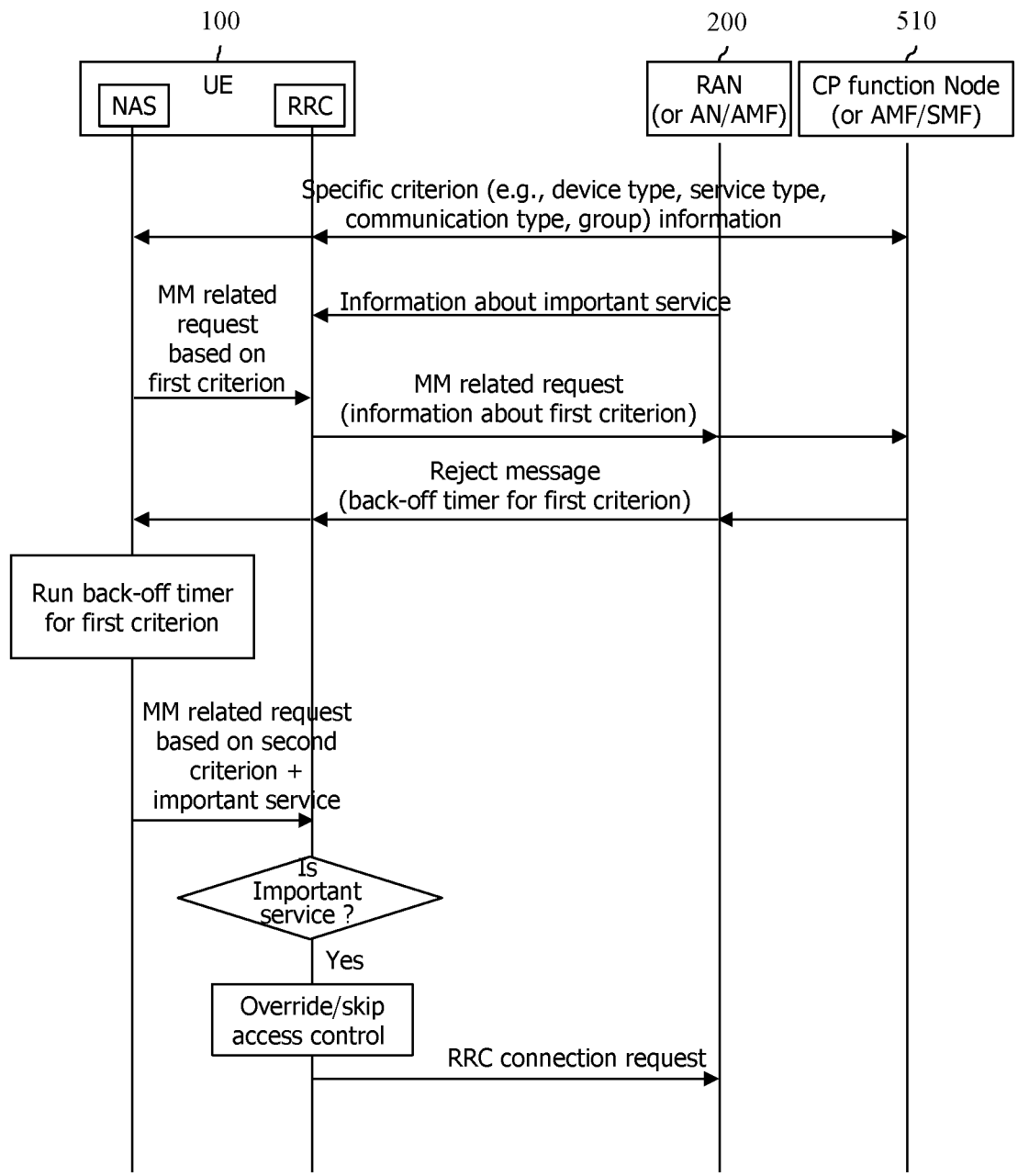
FIG. 7 is a diagram illustrating a procedure according to a method suggested in the present specification.

A more specific operation will be described with reference to FIG. 7.

First, an RAN (or AN/AMF) 200 may set in advance information about the specific criterion to a UE 100.

Further, information about an important service may be preset (e.g., preset in the form of a management object (MO) according to an OMA-DM scheme or preset in the USIM) to the UE. Alternatively, the RAN (or AN/AMF) 200 may provide information about the important service to the UE through a master information block (MIB), a system information block (SIB), or a NAS signaling (signaling such as attach request, tracking area update (TAU), location update request procedure, and service request) procedure.

A NAS layer of the UE 100 transfers an MM related request message based on a first criterion to an RRC layer. The RRC layer performs an RRC connection establishment procedure and transmits the MM related request message.

When the network is in a congested and overloaded state, a CP function node (or AMF/SMF) 510 may transmit a reject message. The reject message may include information about the first criterion and back-off timer information for MM congestion control.

Therefore, the NAS layer of the UE drives a back-off timer #1 corresponding to a specific criterion #1 (e.g., UE type #1, service type #1, communication type #1, and specific group #1) of the UE.

In this way, when the back-off timer is driven, the UE may not perform a NAS signaling request (e.g., attach request, TAU, location update request, and service request) for mobility management.

However, the UE may perform a NAS signaling request (e.g., attach request, TAU, location update request, and service request) for mobility management corresponding to another specific criterion #2 (e.g., UE type #2, service type #2, and communication type #2).

The back-off timers operating according to the specific criterion may have different values (i.e., different timers may be used). Values of the back-off timer may be a random value provided by the network. Alternatively, when the network does not provide values of the back-off timer, the UE may arbitrarily determine and use a random value.

The corresponding network means a common core network node (CP plane function node including a control node or gateway).

In order to transmit the NAS signaling request message, an RRC connection establishment procedure should be performed. However, prior to the RRC connection establishment procedure, access control is first performed in the RRC layer. In this case, the fifth method enables congestion control of the NAS layer and access control of the RRC layer to be bypassed or overridden for a specific important service (e.g., emergency/urgent/exception data transmission, provider defined/specific data service, (emergency or general) voice call, and transmission of delay-sensitive data).

The NAS layer of the UE may notify the RRC layer of information about the corresponding important service through a specific indication or call type (and/or RRC establishment cause) or a specific category. The RRC layer may skip or bypass a check of access control based on information provided from the NAS layer and information (e.g., an instruction to skip a check of access control for a specific service) provided from the network (e.g., through MIB or SIB).

In this case, even though access to the cell is currently barred and even though the back-off timer for mobility management and/or session management is driven, the NAS layer of the UE may override or stop/pause the back-off timer and perform a NAS signaling request procedure for a corresponding important service (for mobility management and/or session management). In this case, the NAS layer may notify the RRC layer of information about the corresponding important service through specific indication or information (e.g., call type and/or RRC establishment cause or specific category).

The NAS layer and the RRC layer may store a state in which access to the cell is barred or in which a back-off timer is driven. Specifically, the NAS layer and the RRC layer may simultaneously store such state information or only one of the NAS layer and the RRC layer may store and manage such state information.

In addition, the RRC layer may notify the NAS layer of a result (success or failure) of access control. When access to the cell is barred, the RRC layer may drive a barring timer. In this case, the barring timer may operate according to the specific criterion (e.g., corresponding UE type, service type, communication type, specific group, or ID of network slice (or network slice instance)). When access to the cell is barred, the NAS layer may not perform a new NAS signaling request procedure except when the corresponding important service is started and a NAS signaling request is transmitted accordingly. When the barring timer expires, the RRC layer provides mitigation information/indication for barring to the NAS layer and thus the NAS layer may perform a NAS signaling request procedure for mobility management and/or session management.

VI. Sixth Method

A six method divides into the case where the UE does not roam and the case where the UE roams and describes congestion control and access control on a network slice basis, congestion control and access control on a network slice and additional information/parameter basis, and congestion control and access control on an APN (or DNN) basis, congestion control and access control on an APN (or DNN) and additional information/parameter basis, and congestion control and access control on an APN (or DNN) and network slice basis.

Figure 8A:
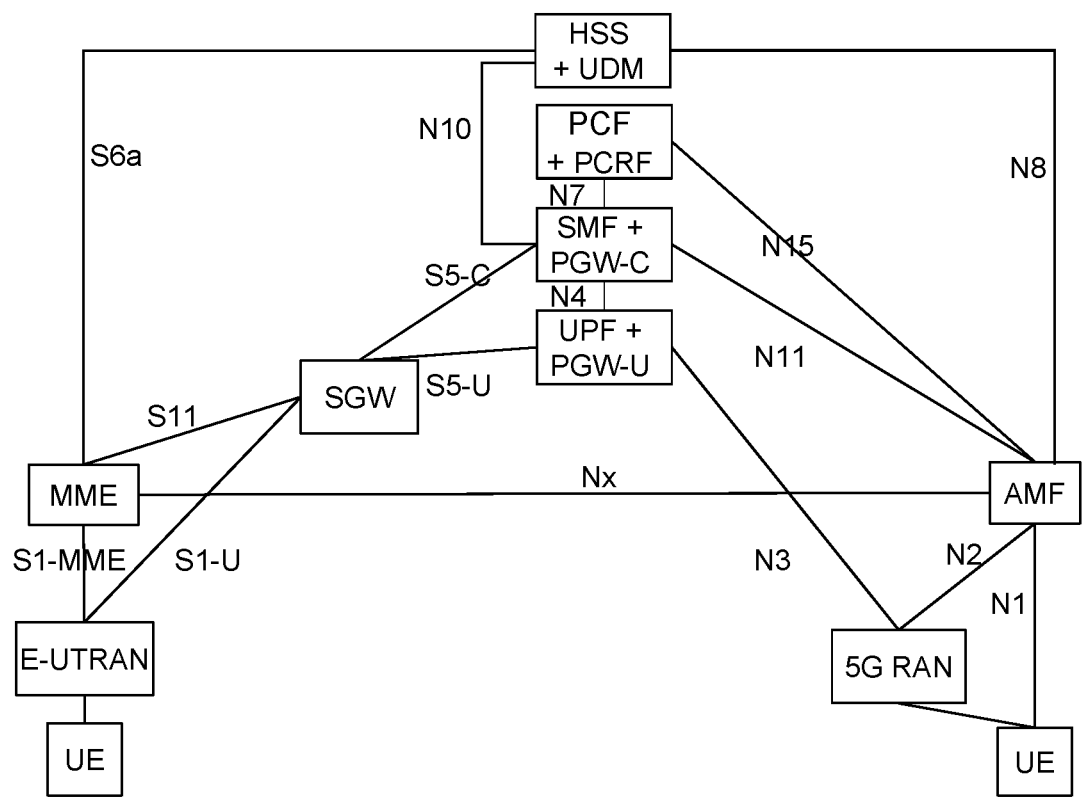
FIG. 8a illustrates architecture of the case in which a UE does not roam.
Figure 8B:
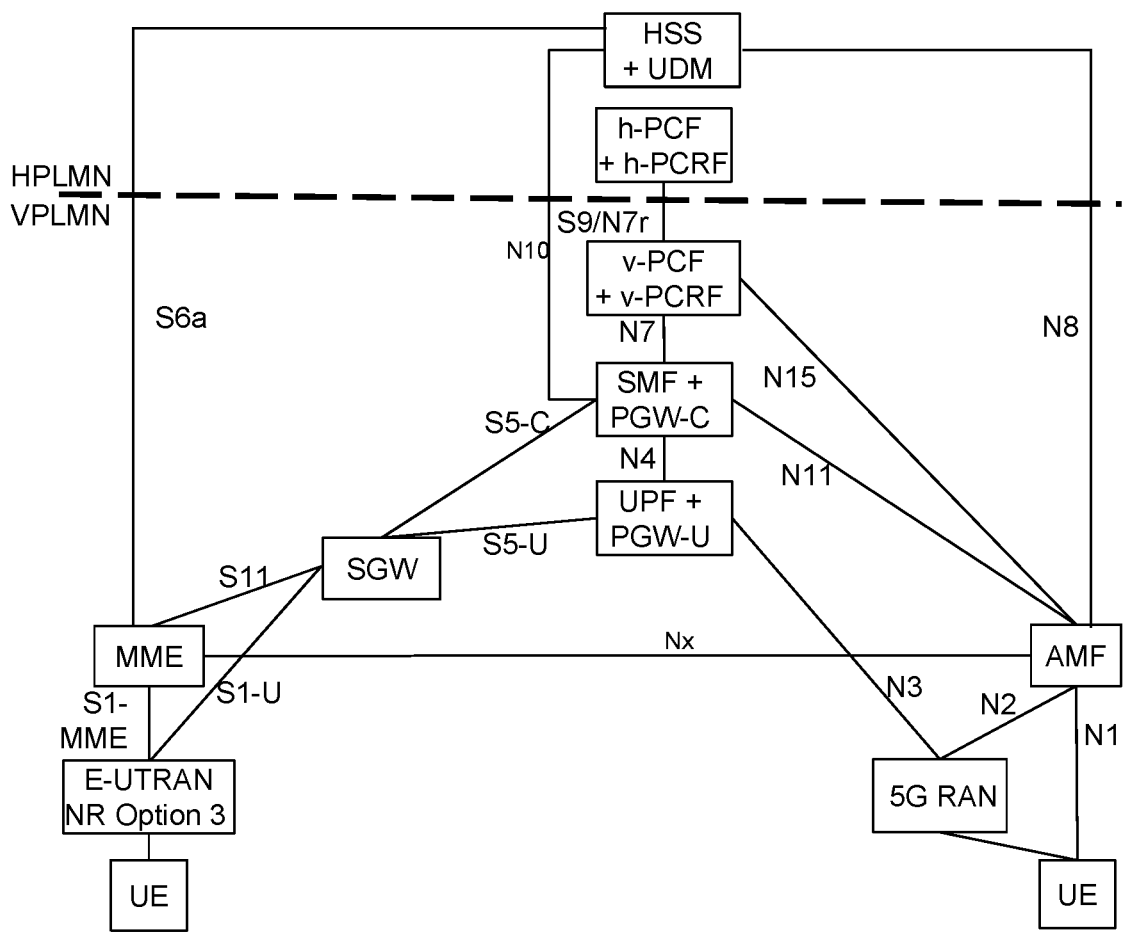
FIG. 8b illustrates architecture of the case in which a UE roams.

FIG. 8a Illustrates Architecture when the UE does not Roam, and FIG. 8b Illustrates Architecture when the UE Roams.

Referring to FIG. 8a, when the UE does not roam, an E-UTRAN, an EPC, and a 5G mobile communication network for conventional 4G LTE may be interworked each other. In FIG. 8a, a packet data network gateway (PGW) for a conventional EPC is divided into a PGW-U that takes charge of only a user plane and a PGW-C that takes charge of a control plane. The PGW-U is merged into a user plane function (UPF) of a 5G core network, and the PGW-C is merged into a session management function (SMF) of a 5G core network. A policy and charging rules function (PCRF) for the conventional EPC may be merged into a policy control function (PCF) of the 5G core network. A home subscriber server (HSS) for the conventional EPC may be merged into unified data management (UDF) of the 5G core network. The UE may access to the core network through the E-UTRAN, and the UE may also access the core network through a 5G radio access network (RAN) and access and mobility management function (AMF).

Referring to FIGS. 8b and 8b, when the UE roams to a visited public land mobile network (VPLMN), data of the UE are transferred via a Home PLMN (HPLMN).

In a structure of FIGS. 8b and 8b, only conventional congestion control and access control schemes may be applied to UEs accessed through 4G LTE. Further, for UEs accessed through 4G LTE, conventional congestion control and access control schemes may not be operated on a network slice (or network slice instance) basis, on additional information/parameter basis, or on an APN (or DDN) basis, but may be operated only on a UE basis as in the conventional case. However, for UEs accessed through the 5G RAN, new congestion control and access control schemes may be operated on a network slice (or network slice instance) basis, on additional information/parameter basis, or on an APN (or DDN) basis.

Here, the conventional congestion control and access control schemes mean access class barring (ACB), service specific access control (SSAC), extended access barring (EAB), and application specific congestion control for data communication (ACDC).

VI-1. First Implementation of Sixth Method

When the UE moves from a 4G mobile communication network (EPC/E-UTRAN) to a 5G mobile communication network, a 5G mobile communication network node (e.g., AMF or SMF) includes information of the network slice (or network slice instance) or information such as additional information/parameter in a handover command, a registration accept message, a PDU session accept message, or a PDU session modify accept message and transmits the command or the message to the UE. Accordingly, the UE performs the congestion control and access control on a slice (or network slice instance) basis, on additional information/parameter basis, or on an APN (or DDN) basis based on the received information.

When the above information is not included in the handover command, the registration accept message, the PDU session accept message, or the PDU session modify accept message transmitted by the 5G mobile communication network node, even if the UE is accessed to the network, the congestion control and access control may be performed on a UE basis, as in the conventional case. That is, the UE may perform the congestion control and access control independently of the slice (or network slice instance) and additional information/parameter.

VI-2. Second Implementation of Sixth Method

In the 5G mobile communication network, an access control method may be supported differently on a network slice (or network slice instance) basis or on a specific criterion (e.g., UE type, service type, communication type, and specific group) basis. For example, a network slice #1 (or network slice instance #1) may support ACB and S SAC, a network slice #2 (or network slice instance #2) may support ACB, S SAC, and EAB, a network slice #3 (or network slice instance #3) may support ACB, ACB, SSAC, and ACDC, and a network slice #4 (or network slice instance #4) may support access control (AC) for a 5G system. Here, the above description may be equally applied to a case where an access control method is differently supported on a specific criterion (e.g., UE type, service type, communication type, and specific group) basis.

In the above scenario, the 5G mobile communication network node (e.g., AMF or SMF) includes information about the supporting network slice (or network slice instance) or additional information/parameter information in a registration accept message, a PDU session accept message, and a PDU session accept modify message and provides the message to the UE. Alternatively, the 5G mobile communication network node (e.g., AMF or SMF) may provide information about the supporting network slice (or network slice instance) or additional information/parameter together with a supporting access control scheme to the UE.

An access control scheme supported by the UE or an access control scheme supported by the UE on a network slice (or network slice instance) basis may be preset (e.g., preset in the form of a management object (MO) according to an OMA-DM scheme or preset in the USIM). Alternatively, the network may provide the access control scheme to the UE through a master information block (MIB), a system information block (SIB), or a NAS signaling (signaling such as attach request, tracking area update (TAU), location update request procedure, or service request) procedure.

i) When only an access control scheme supported by the UE is preset/provided i-1) When a 5G mobile communication network node (e.g., AMF or SMF) includes information about a network slice (or a network slice instance) or additional information/parameter together with a supporting access control scheme in a registration accept message, a PDU session accept message, and a PDU session accept modify message and transmits the message, The NAS layer of the UE includes information about the preset/provided access control scheme in a mobility management related request (e.g., attach request, TAU, location update request, and service request) message or a NAS signaling request (e.g., attach request, PDU session setup request, and PDU session modify request) message for session management transmitting to the network node (e.g., AMF or SMF). The UE performs access control using an access control scheme supported by the network slice (or network slice instance).

When an access control scheme supported by the corresponding network slice (or network slice instance) and an access control scheme supported by the UE are different, the UE may search for and select a network slice (network slice instance) supporting an access control scheme supported by the UE and then perform access control for transmitting a corresponding NAS signaling request based on a network policy/setting or (pre)setting in the UE.

Alternatively, when an access control scheme supported by the corresponding network slice (or network slice instance) and an access control scheme supported by the UE are different, the UE may override a preset/provided access control scheme (e.g., EAB or ACDC) of the UE for the corresponding network slice (or network slice instance) and apply a basic access control scheme (e.g., ACB).

That is, when the UE is currently configured to ACDC and when a network slice (or network slice instance) #1 provided from the network supports ACB and ACDC, in order to transmit a NAS signaling request for the network slice (or network slice instance) #1, the UE performs an access control check according to ACDC. When a network slice (or network slice instance) #2 provided from the network supports ACB and S SAC, the UE first searches for and selects a network slice (or network slice instance) #2 supporting ACDC and performs an access control check according to ACDC in order to transmit a NAS signaling request for the network slice (or network slice instance) #2. Otherwise, the UE may use ACB with a basic access control scheme.

i-2) When the 5G mobile communication network (e.g., AMF or SMF) includes only a network slice (or network slice instance) or additional information/parameter in a registration accept message, a PDU session accept message, and a PDU session accept modify message and transmits the message to the UE, the NAS layer of the UE includes corresponding network slice (or the network slice instance) information in a message for a mobility management related request (e.g., attach request, TAU, location update request, and service request) or a message for a NAS signaling request (e.g., attach request, PDU session setup request, and PDU session modify request) for session management and transmits the message to the network (e.g., AMF or SMF). In this case, the UE performs access control using a currently set/provided access control scheme before transmission of the message. That is, instead of applying different access control schemes on a network slice (or network slice instance) basis, the UE applies the same currently set/provided access control scheme on a network slice (or network slice instance) basis.

That is, when the UE is currently configured to ACDC and when a network slice (or network slice instance) #1 is provided from the network, the UE performs an access control check according to ACDC for a NAS signaling request for the network slice (or network slice instance) #1. When a network slice (or network slice instance) #2 is provided from the network, the UE performs an access control check according to ACDC for a NAS signaling request for the corresponding network slice (or network slice instance) #2.

ii) When the network slice (or network slice instance) supported by the UE and information about an access control scheme supported in the corresponding network slice is together set/provided, ii-1) When the 5G mobile communication network (e.g., AMF or SMF) includes a network slice (or network slice instance) and information about a supporting access control scheme, or additional information/parameter, and supported access control scheme information in a registration accept message, a PDU session accept message, and a PDU session accept modify message and transmits the message to the UE, the NAS layer of the UE includes corresponding network slice (or network slice instance) information in a message for a mobility management related request (e.g., attach request, TAU, location update request, and service request) or a message for a NAS signaling request (e.g., attach request, PDU session setup request, and PDU session modify request) for session management and transmits the message to the network (e.g., AMF or SMF). In this case, before transmitting the message, the UE performs an access control check according to an access control scheme supported in the corresponding network slice (or network slice instance).

When an access control scheme supported by the corresponding network slice (or network slice instance) and an access control scheme supported by the UE are different, the UE searches for and selects a network slice (network slice instance) that supports an access control scheme supported by the UE based on a network policy/setting or presetting of the UE and performs an access control check according to the corresponding access control scheme before transmitting the corresponding NAS signaling request.

Alternatively, for the corresponding network slice (or network slice instance), the set/provided access control scheme (e.g., EAB or ACDC) of the UE may be overridden and a default access control (e.g., ACB or AC for 5G system) may be applied.

That is, when the UE is currently configured to EAB and when the network slice (or network slice instance) #1 with supporting ACB, SSAC, and EAB is provided from the network, the UE performs EAB for the network slice (or network slice instance) #1 with corresponding NAS signaling requests to perform access control. When the network slice (or network slice instance) #2 with ACB and SSAC is provided from the network, the UE first searches for and selects a network slice (or network slice instance) #2 supporting EAB and performs EAB for the network slice (or network slice instance) #2 with corresponding NAS signalling requests signaling requests to perform access control. Otherwise, the UE may apply only ACB (default access control mechanism) to perform access control.

ii-2) When the 5G mobile communication network (e.g., AMF or SMF) includes only a network slice (or network slice instance) or additional information/parameter information in a registration accept message, a PDU session accept message, and a PDU session accept modify message and provides the message to the UE, the NAS layer of the UE operates in the same manner as described in ii-1).

Alternatively, the UE may perform access control based on the specific criterion (e.g., UE type, service type, communication type, and specific group) or additional information/parameter such as an APN (or DNN) or an ID of a network slice (or network slice instance) with a method similar to a method of performing access on a network slice (or network slice instance) basis.

The second implementation of the sixth method may be applied even when performing congestion control and/or access control on a network slice (or network slice instance) basis in the case where the UE does not roam, as shown in FIG. 8a as well as the case where the UE roams, as shown in FIG. 8b.

VI-3. Third Implementation of Sixth Method

When the UE moves from a 5G mobile communication network to a 4G mobile communication network (e.g., EPC/E-UTRAN), a node (e.g., MME) within the 4G mobile communication network includes the network slice (or network slice instance) or additional information/parameter in a handover command, an attach accept message, a TAU accept message, a PDN connection accept message, or a bearer resource modify accept message and does not provides the message to the UE. Accordingly, the UE performs congestion control and access control on a UE basis or on an APN basis. That is, the UE may perform the congestion control and the access control independently of a network slice (or network slice instance) and additional information/parameter.

In the first, second, and third implementations, mobility management congestion control of the NAS layer may be performed on a network slice basis and/or on additional information/parameter basis, and session management congestion control of the NAS layer may be performed according to an APN (or DNN) and additional information/parameter or according to an APN (or DNN) and a network slice.

The foregoing first to sixth methods may be combined and used.

The foregoing description may be implemented in hardware. This will be described with reference to FIG. 10.

Figure 9:
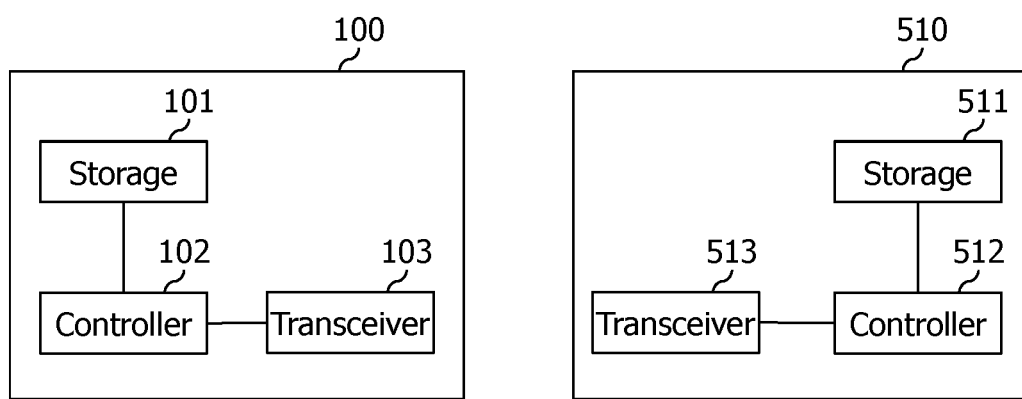
FIG. 9 is a block diagram illustrating a configuration of a UE 100 and a network node according to an embodiment of the present invention.

FIG. 9 is a Block Diagram Illustrating a Configuration of a UE and a Network Node According to an Embodiment of the Present Invention.

As shown in FIG. 9, the UE 100 includes a storage 101, a controller 102, and a transceiver 103. The network node may be an access network (AN), a radio access network (RAN), an AMF, a CP function node, and an SMF. The network node includes a storage 511, a controller 512, and a transceiver 513.

The storages store the above-described method.

The controllers control the storages and the transceivers. Specifically, the controllers execute each of the methods stored in the storages. The controllers transmit the above-described signals through the transceivers.

While the present invention has been particularly shown and described with reference to exemplary embodiments thereof, it is to be understood that the present invention is not limited to the disclosed exemplary embodiments, but, on the contrary, may be modified, changed, or improved to various forms within the spirit of the present invention and the scope described in claims.

What is claimed is:

1. A method in which a user equipment (UE) performs access control, the method comprising:
   operating, by a non-access-stratum (NAS) layer of the UE, a back-off timer, based on that an access via a first network slice is barred, wherein the operation of the back-off timer depends on the first network slice;
   detecting, by the NAS layer of the UE, that an important service is requested, wherein the important service is to be provided via a second network slice;
   transferring, by the NAS layer of the UE, information about the important service and a NAS signaling request to a radio resource control (RRC) layer of the UE, while the back-off timer is operating based on that the access via the first network slice is barred; and
   skipping or overriding, by the RRC layer, a check for access control based on the information about the important service,
   wherein the information about the important service is preset in advance.

2. The method of claim 1, wherein the back-off timer is driven on a specific criterion basis.

3. The method of claim 2, further comprising receiving in advance setting information about the specific criterion,
   wherein the specific criterion comprises at least one of a UE type, a service type, a communication type, or a group.

4. The method of claim 1, wherein the access via the first network slice is barred on a specific criterion basis.

5. The method of claim 1, further comprising overriding or stopping the driving back-off timer.

6. The method of claim 1, wherein the information about the important service is included in a call type, an RRC establishment cause, or a category to be transferred to the RRC layer.

7. A user equipment configured to perform access control, the user equipment (UE) comprising:
   a transceiver; and
   a processor configured to control the transceiver and to drive a radio resource control (RRC) layer and a non-access-stratum (NAS) layer of the UE, wherein the NAS layer of the UE operates a back-off timer, based on that an access via a first network slice is barred, wherein the operation of the back-off timer depends on the first network slice;

wherein the NAS layer of the UE detects that an important service is requested, wherein the important service is to be provided via a second network slice;

wherein the NAS layer of the UE transfers information about the important service and a NAS signaling request to the RRC layer of the UE, while the back-off timer is operating based on that the access via the first network slice is barred, and the RRC layer of the UE skips or overrides a check for access control based on the information about the important service, wherein the information about the important service is preset in advance.

8. The user equipment of claim 7, wherein the back-off timer is driven on a specific criterion basis.

9. The user equipment of claim 8, wherein the processor is configured to receive in advance setting information about the specific criterion, and the specific criterion comprises at least one of a UE type, a service type, a communication type, or a group.

10. The user equipment of claim 7, wherein the access via the first network slice is barred on a specific criterion basis.

11. The user equipment of claim 7, wherein the processor is configured to override or stop the driving back-off timer.

12. The user equipment of claim 7, wherein the information about the important service is included in a call type, an RRC establishment cause, or a category to be transferred to the RRC layer.

* * * * *